Jan. 21, 1936.       R. GUNN       2,028,153
RADIATION DETECTOR
Filed Nov. 12, 1931
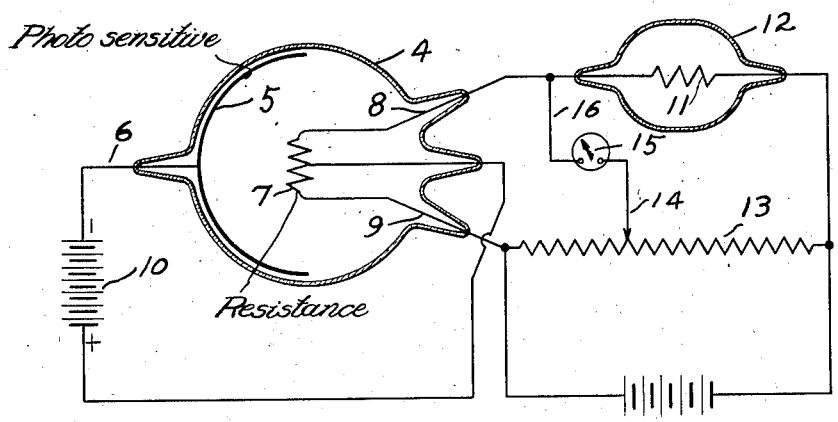
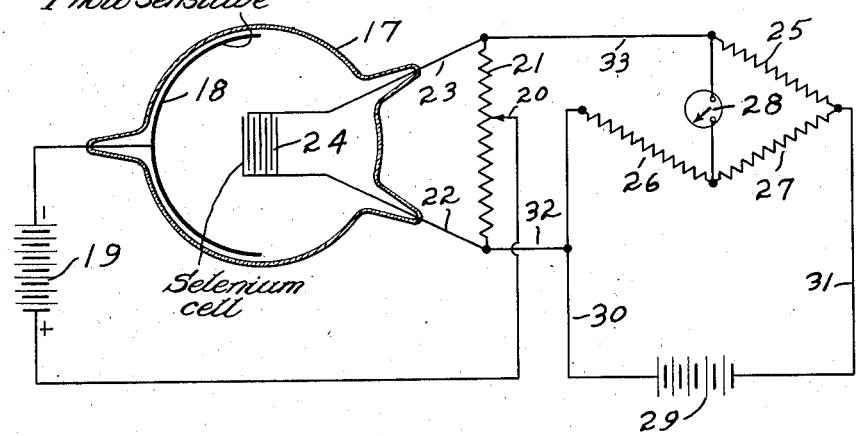
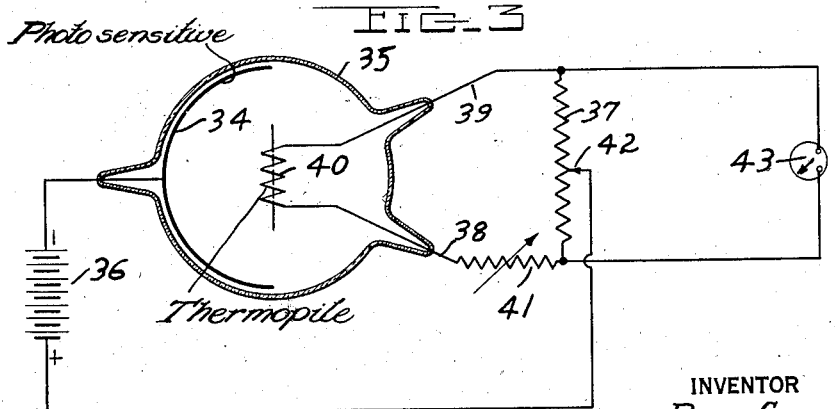
INVENTOR
Ross Gunn
BY
ATTORNEY Patented Jan. 21, 1936

2,028,153

UNITED STATES PATENT OFFICE 2,028,153

RADIATION DETECTOR

Ross Gunn, Washington, D. C.

Application November 12, 1931, Serial No. 574,571

17 Claims. (Cl. 250—41.5)

(Granted under the act of March 3, 1883, as amended April 30, 1928; 370 O. G. 757)

This invention relates to an improved radiation detector for electromagnetic waves.

The object of my invention is to provide a more sensitive means for the detection of radiant energy, such as light and heat waves, and especially devices of a type that may be used with low resistance indicating instruments.

In the drawing:

Fig. 1 shows one form of my invention that involves the application of the Wheatstone bridge principle;

Fig. 2 shows a different form of photo-active element and a compensating device to eliminate the effects of stray currents;

Fig. 3 shows an embodiment of my invention using a thermopile as the electron-sensitive element.

The operation of my invention depends upon the well known phenomenon that the incidence of light upon potassium and certain other materials results in the freeing of electrons therefrom, the rate of liberation of electrons being proportional to the intensity of the light. The kinetic energy of the moving electrons is utilized to heat a wire, and the change in resistance thus caused is measured by the sensitive Wheatstone bridge.

The bulb 4 contains a photo-active element 5 connected with the exterior by wire 6 sealed into the bulb, and a coil 7 of fine wire disposed substantially at the focus of the curved surface of element 5 and connected to sealed-in leads 8 and 9. Battery 10 is connected to apply a negative potential to element 5 and a positive potential to coil 7, which supplies the accelerating potential to move the electrons rapidly from the emissive surface to the coil, the connection to coil 7 being made at the center thereof to avoid any unbalance of the circuit that might result from an asymetric connection to this element.

Lead wire 8 is connected to a resistance coil 11 sealed in a bulb 12, coils 7 and 12 forming two series-connected arms of a Wheatstone bridge. The resistance 13, connected to coil 12 and to lead wire 9, constitutes the other two series-connected arms of the bridge, the division point between these arms being at the point of contact of variable connection 14 of galvanometer 15 with resistance 13. The other terminal 16 of galvanometer 15 is connected between coils 7 and 12. Battery 47 is connected across the terminals of resistance 13. If, owing to temperature differences, there should be a differential variation of resistance in coil 11 as compared with coil 7, a substantial error in the measurements might be made. The two coils, therefore, are made of the same form and placed under the same conditions as nearly as feasible, coil 11 being sealed in bulb 12 to accomplish this purpose.

When light falls upon photo-active element 5, electrons are freed therefrom and under the accelerating influence of the potential between that element and coil 7, they acquire kinetic energy equivalent to the potential through which they fall; i. e., the voltage of battery 10. This energy is given up to coil 7 in the form of heat when the electrons impinge thereon, their heating effect on the coil being sufficient to cause detectable variations in the resistance of the coil when the accelerating voltage is ten volts or more. The changes in resistance of coil 7 unbalance the bridge, and this condition of unbalance is indicated by meter 15. The degree of deflection thereof is a measure of the intensity of the radiation falling on element 5.

The bulb 17 in Fig. 2 contains a photo-active element 18, similar to 5, that is connected to the negative terminal of battery 19 whereof the other terminal has a variable connection 20 with resistance 21 that is shunted across the leads 22 and 23 of a photo-active conductor 24, which may be a selenium cell, a molybdenum cell, or the like, that forms one arm of a Wheatstone bridge. Resistance 21 and slider 20 are used to counteract the effect of stray currents from battery 19.

Resistor 25 is the other arm of the bridge in series with cell 24. Resistors 26 and 27 in series form the arms of the bridge in parallel with cell 24 and resistor 25. Galvanometer 28 is connected across the junction points of the pairs of resistances in the parallel circuits of the bridge. Battery 29 is connected through wires 30 and 31 to the terminals of the parallel circuits of the bridge. The wires 32 and 33 connect the cell 24 into its proper position in the bridge circuit.

The operation of the device in Fig. 2 depends upon the newly discovered fact that selenium and similar materials greatly change in resistance when electrons fall thereon. The movement of electrons extracted from element 18 by the incidence of light thereon is accelerated by the potential difference existing between that element and cell 24. When the electrons impinge on cell 24, their kinetic energy is converted to heat which changes the resistance of cell 24 proportionately to the number of electrons striking it, and since that number is dependent upon the intensity of the radiant energy falling upon element 18, the resistance changes may be used to measure that intensity. As in the embodiment of my invention shown in Fig. 1, the balance of the bridge is disturbed by variations of the resistance of that arm of the bridge on which the electrons impinge and a deflection of meter 28 ensues, the degree of such deflection being a measure of the resistance change caused by the electron stream.

In Fig. 3, a photo-active element 34 is mounted in bulb 35 and is connected to the negative terminal of battery 36. The other terminal of battery 36 has a variable connection 42 with resistance 37 that is connected across the lead wires 38 and 39 from thermopile 40 in bulb 35. As in the device shown in Fig. 2, the battery 36 supplies the accelerating potential for electrons removed from element 34 by incident radiant energy, and the variable connection of battery 36 to resistance 37 makes it possible to eliminate stray currents from the battery. Resistance 41 is inserted between lead 38 and the adjacent terminal of resistance 37 to make the control of stray currents easier and more complete.

The impact of the electrons from element 34 upon thermopile 40 generates heat that sets up a thermo-electric current that is measured by sensitive meter 43, the magnitude of the current giving a measure of the rate of emission of electrons from element 34 and hence of the intensity of the radiation causing that emission.

The invention described herein may be manufactured and used by or for the Government of the United States of America for governmental purposes, without the payment of any royalties thereon or therefor.

I claim:

1. In a photo-sensitive device, a cell comprising a bulb, a concave photo-active element therein, and a resistance coil of fine wire substantially at the center of curvature of said element; a battery having its negative terminal connected to said element and its positive terminal connected to the mid-point of said coil, a second resistance coil sealed in a bulb connected in series with said coil, a resistance connected in parallel with the said two coils, a battery connected across the terminals of said resistance, and a galvanometer having one terminal connected between said coils and the other terminal connected to a variable contact with said resistance whereby said coils form two arms of a Wheatstone bridge and said resistance forms the other two arms thereof in parallel with the aforesaid two arms.

2. In a photo-sensitive device, a cell comprising a bulb, a photo-active element therein, and a coil of resistance wire disposed to receive electrons from said element, a second bulb, a second coil like the said coil sealed in said second bulb and connected in series with said coil, a resistance connected in parallel with said two coils, a galvanometer having one terminal connected between said coils and the other terminal with a variable connection to said resistance, a battery connected across the terminals of said resistance, and means to impress a negative potential upon said element and a positive potential upon said first mentioned coil.

3. In a photo-sensitive device, a bulb, a photo-active element therein, a resistance coil disposed to receive electrons from said element, means connected to and coacting with said coil to form a Wheatstone bridge whereof said coil is one arm, and means to impress electron accelerating potentials upon said element and said coil.

4. In a radiation-sensitive device, a bulb, an element therein adapted to emit electrons when subjected to radiant energy, a resistance member disposed to receive electrons from said element, means coacting with and connected to said member to form a Wheatstone bridge whereof said resistance is one arm, and means to impress electron accelerating potentials upon said element and said member.

5. In a photo-sensitive device, a bulb, a concave photo-active element therein, a cell having an electron-impact response similar to that of selenium disposed substantially at the center of curvature of said element, a resistance connected in series with said cell, two series-connected resistances connected in parallel with said cell and said resistance, a galvanometer having one terminal connected between said cell and said resistance and the other terminal connected between said two resistances, a battery connected across said two resistances, a control resistance connected across the terminals of said cell, and a second battery having its negative terminal connected to said element and its positive terminal connected variably to said control resistance.

6. In a photo-sensitive device, a photo-active element, a cell having an electron-impact response like that of selenium disposed to intercept electrons from said element, a bulb in which said element and said cell are enclosed, means coacting with and connected to said cell to form a Wheatstone bridge whereof said cell is one arm, a resistance connected across the terminals of said cell, means to impress a negative potential upon said element and variably connected to said resistance to impress a positive potential upon said cell.

7. In a radiation-sensitive apparatus, an element adapted to emit electrons when subjected to radiant energy, a device having electron-impact responsive characteristics like those of selenium disposed to receive electrons from said element, a bulb in which said device and said element are enclosed, means to measure the electron-impact response of said device, means to impress electron accelerating potentials upon said element and said device, and means to eliminate the effects of stray currents from said potential impressing means.

8. In a radiation-sensitive apparatus, a radiation-sensitive cell including a radiation-excited source of electrons, a device having electron-impact response characteristics like those of selenium, means to measure the electron-impact response of said cell, means to impress electron accelerating potentials upon said cell, and means to eliminate the effect of stray currents from said potential impressing means.

9. In a photo-sensitive device, a concave photo-active element, a thermopile disposed substantially at the center of curvature of said element, a bulb in which said element and said thermopile are enclosed, a resistance connected to one terminal of said thermopile, a galvanometer connected to said resistance and to the other terminal of said thermopile, a second resistance connected across the connections to said galvanometer, and a battery with its negative terminal connected to said element and its positive terminal with a variable connection to said second resistance.

10. In a photo-sensitive device, an electron emissive element, a thermopile disposed to intercept electrons from said element, a vessel in which said element and said thermopile are enclosed, means to measure thermo-electric currents from said thermopile, means to impress electron accelerating potentials upon said element and said thermopile, and means to eliminate the effects of stray currents from said potential impressing means.

11. In a radiation-sensitive device, an electron emissive element, a thermo-electric generator actuatable by electrons from said element, means to accelerate the passage of electrons from said element to said generator, and means to control stray currents from the aforesaid means.

12. In a radiation-sensitive device, an electron emissive element, means having electron-impact response characteristics similar to those of selenium disposed to intercept electrons from said element, means to accelerate the passage of electrons from said element to said first-mentioned means, and means to control stray currents from said accelerating means.

13. An apparatus for measuring light intensities, comprising a photo-excited source of electrons whereof the electron emission is proportional to the intensity of light falling thereon, a resistance element disposed to intercept the electrons from said source, means to set up a potential difference between said source and said element and means to measure the change in the resistance of said element due to impact of electrons thereon, the electron flow being controlled wholly by the intensity of excitation of said element and the magnitude of said potential.

14. An apparatus for measuring light intensities, comprising a focusing photo-excited source of electrons whereof the electron emission is proportional to the intensity of light falling thereon, an element having a characteristic variable proportionately to electron impact thereon disposed at the focus of said source, means to set up a potential difference between said source and said element and means to measure changes in such characteristic, the electron flow being controlled wholly by the intensity of excitation of said element and the magnitude of said potential.

15. An apparatus for measuring light intensities, comprising a photo-excited source of electrons whereof the electron emission is proportional to the intensity of light falling thereon, an element having a characteristic variable proportionately to electron impact thereon disposed to intercept electrons from said source, means to set up a potential difference between said source and said element and means to measure changes in such characteristic, the electron flow being controlled wholly by the intensity of excitation of said element and the magnitude of said potential.

16. In combination, a photo-sensitive electron emissive element, an electron-impact responsive collector disposed to receive the electrons therefrom, means to impress electron accelerating potentials upon said element and said collector, and means to eliminate the effects of stray currents from said potential impressing means.

17. In combination, an electron emissive cathode, an anode disposed to receive electrons therefrom, means to impress accelerating potentials on said anode and said cathode, and means to eliminate the effects of stray currents from said potential impressing means.

ROSS GUNN.